(12) United States Patent
Ford, III (10) Patent No.: US 7,650,565 B2
(45) Date of Patent: Jan. 19, 2010

(54) METHOD FOR MANAGING ANNOTATIONS IN A COMPUTER-AIDED DESIGN DRAWING

(75) Inventor: John G. Ford, III, Mill Valley, CA (US)

(73) Assignee: AUTODESK, Inc., San Rafael, CA (US)

(*) Notice: Subject to any disclaimer, the term of this patent is extended or adjusted under 35 U.S.C. 154(b) by 0 days.

(21) Appl. No.: 11/669,738

(22) Filed: Jan. 31, 2007

(65) Prior Publication Data

US 2008/0180460 A1 Jul. 31, 2008

(51) Int. Cl.
*G06F 17/00* (2006.01)
(52) U.S. Cl. ............... 715/230; 345/660; 345/666; 700/182; 703/1; 703/6; 703/7; 715/231; 715/232
(58) Field of Classification Search ............ 700/182, 700/97, 98; 715/512, 964; 345/660, 666, 345/472, 472.1, 472.2; 703/1, 6, 7
See application file for complete search history.

(56) References Cited

U.S. PATENT DOCUMENTS 6,611,725 B1 * 8/2003 Harrison et al. ............... 700/98

OTHER PUBLICATIONS

"Using AutoCAD 2000", Special Edition, Que Corporation, 2000.*

* cited by examiner

*Primary Examiner*—Kidest Bahta
*Assistant Examiner*—Carlos Ortiz Rodriquez
(74) *Attorney, Agent, or Firm*—Patterson & Sheridan, LLP (57) ABSTRACT

Annotations in CAD drawings are given fixed sizes so that CAD application will generate the annotations at the fixed size even though modeled objects within the CAD drawing are scaled in accordance with a paper space scale selected by the CAD designer. The annotations generally comprise text annotations and graphic annotations, including one or more of text, dimensions, hatch patterns, and symbols, and are represented as annotation objects having multiple properties, such as size, visibility, position and rotation.

20 Claims, 13 Drawing Sheets

METHOD FOR MANAGING ANNOTATIONS IN A COMPUTER-AIDED DESIGN DRAWING

BACKGROUND OF THE INVENTION

1. Field of the Invention

The present invention generally relates to computer-aided design and, more particularly, to a method for managing annotations in a computer-aided design drawing.

2. Description of the Related Art

The term computer-aided design (CAD) generally refers to a broad variety of computer-based tools used by architects, engineers, and other construction and design professionals. CAD applications may be used to construct computer models representing virtually any real-world object, e.g., a machine part, a bicycle, a house, a skyscraper, or a stretch of highway complete with bridges and buried utilities.

Most CAD applications provide an environment for creating models at their real world size. This environment is typically called model space. In model space, everything exists as in the real world, and the model provides a 1:1 scale representation of the real-world objects. If a building is 80 feet by 40 feet, it is created at that size.

Since the model or portions thereof need to be annotated and output to a sheet of paper, CAD applications often have an environment for composing different views of the model along with annotations that document the model. This environment is known as paper space. In paper space, the sheet of paper is represented in 1:1 scale, and the information contained in model space is presented in paper space by way of one or more viewports that can be scaled, rotated, and arranged in different ways to create the final drawing to be printed or plotted.

Viewports in paper space are simply bounded views into the model. In order to display a large model on a sheet of paper, viewports can be assigned a viewport scale.

The display of the model is scaled so that it can be seen on the sheet at the desired size, e.g., ¼"=1'-0" or 1:100, 2:1, etc. Different parts of the model may be displayed in different viewports in paper scale at different scales. The sheet (paper space) is generally plotted at scale of 1:1.

While users like to design models at their real-word size, they need to create their annotations at a size that is appropriate for the sheet. Annotations may be created in the paper space environment or in the model space environment. In conventional CAD applications, when the text, dimensions, symbols, and other annotations are drawn in model space (the same environment as the model geometry), these annotations along with the model geometry are scaled down when displayed in a viewport in paper space. The size of such text, dimensions, symbols, and other annotations has to be carefully selected so that they will scale correctly to give the desired appearance in the final printouts and plots that will be generated from paper space. For example, if drawing sheets of a model are to be plotted with the model scaled at 1:100, and the user wants the plotted text size to be ⅛", the text must be drawn 100/8" in model space.

When working with a few viewports in paper space or with a single paper space scale, the planning that is required for correct annotation scaling may be manageable. However, when the same geometry and annotations need to be plotted multiple times at different scales, the user has to create duplicate annotations on different layers, in different positions, and adjust the visibility of each layer to create the desired effect. This, of course, not only takes a significant amount of time, but results in potential out-of-sync problems, making the drawing environment more complex and difficult to manage.

SUMMARY OF THE INVENTION

The present invention provides a method for managing annotations in CAD drawings, and a computer readable storage medium containing instructions for a computer system to carry out such a method. With the present invention, the CAD designer can specify a fixed paper size for the annotations and the CAD application will generate the annotations at the specified fixed size even though modeled objects within the CAD drawing are scaled in accordance with a paper space scale selected by the CAD designer.

A method for managing annotations in a CAD drawing according to a first embodiment of the present invention includes the steps of receiving a user input that specifies an annotation scale and generating annotations having a size that is equal to a fixed size relative to the sheet of paper on which they are intended to be displayed. The annotations comprise one or more of text, dimensions, hatch patterns, and symbols, and are represented as annotation objects having multiple properties, such as size, visibility, position and rotation.

The annotation objects can support one or more scales. When the scale of the model is changed (e.g., when plotting or creating a sheet that contains views of the model), the size of the annotations will change (relative to the geometry of the model) to remain at a specified size relative to the sheet. The same annotation object can display at different sizes (relative to the geometry of the model) in different views of different scales so it appears at the same size on the sheet.

A method for managing annotations in a CAD drawing according to a second embodiment of the present invention includes the steps of annotating the CAD drawing with text, specifying a fixed size for the text, preparing a first viewport in which the CAD drawing is generated in accordance with a first scale, and preparing a second viewport in which the CAD drawing is to be generated in accordance with a second scale. When the CAD drawing is generated in accordance with either the first scale or the second scale, the size of the text that is generated is the same and is equal to the specified fixed size.

DETAILED DESCRIPTION

Figure 1:
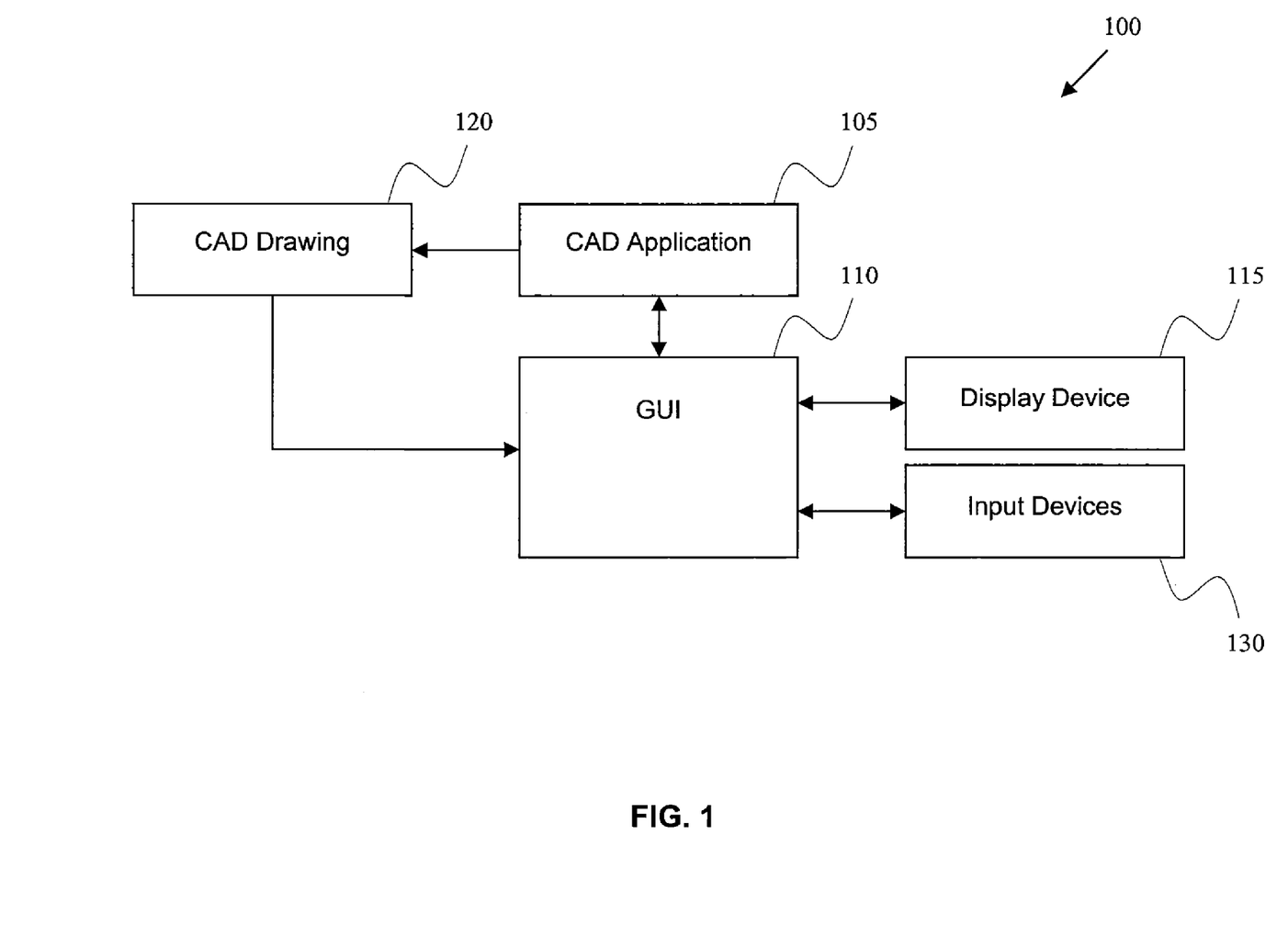
FIG. 1 is a conceptual block diagram of a computer system with which embodiments of the present invention can be practiced.

FIG. 1 is a conceptual block diagram of a computer system 100 with which embodiments of the present invention can be practiced. The components of the computer system 100 illustrated in FIG. 1 include CAD application 105, graphical user interface (GUI) 110, CAD drawing 120, user input devices 130, and a display device 115. CAD application 105 is a software application that is stored in memory and executed by the processor of the computer system 100. It includes software program routines or instructions that allow a user interacting with GUI 110 to create, view, modify and save CAD drawing 120. In the examples provided herein, the CAD application 105 is the AutoCAD® software application program available from Autodesk, Inc. and associated utilities. Typically, user input devices 130 include a mouse and a keyboard, and display device 115 includes a CRT monitor or LCD display.

Figure 2A:
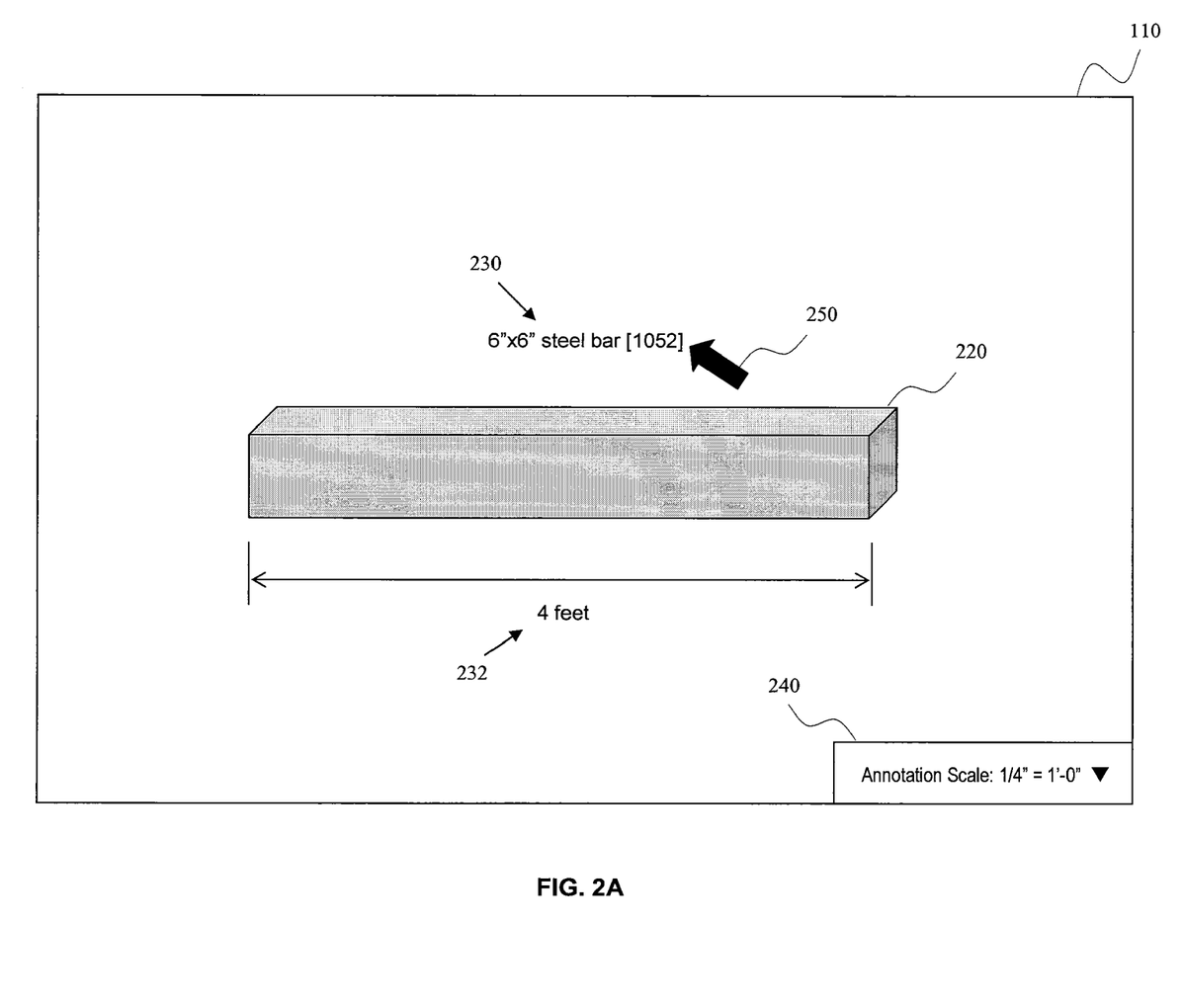
FIGS. 2A-2D are schematic representations of graphical user interfaces that illustrate the process for managing annotations.

In accordance with embodiments of the present invention, CAD application 105 enables a user to specify fixed sizes and other properties of the annotations of CAD drawing 120. FIGS. 2A-2D are schematic representations of GUI 110 that illustrate the process of managing the annotations. FIG. 2A shows a GUI 110 that displays in model space a modeled object 220, various annotations 230, 232 associated with the modeled object 220, and an annotation scale 240. Each of the annotations 230, 232 is represented by a software object and has various properties associated with it. The annotation scale 240 indicates the scale at which the existing annotation objects are displayed and the scale that new annotation objects will be defined. Annotation objects have a property that indicates what scales are supported. For each scale supported, the position, rotation, paragraph width, etc. of the same object can vary. When the system is set to scale not supported by the annotation object, the object can be hidden.

Figure 2B:
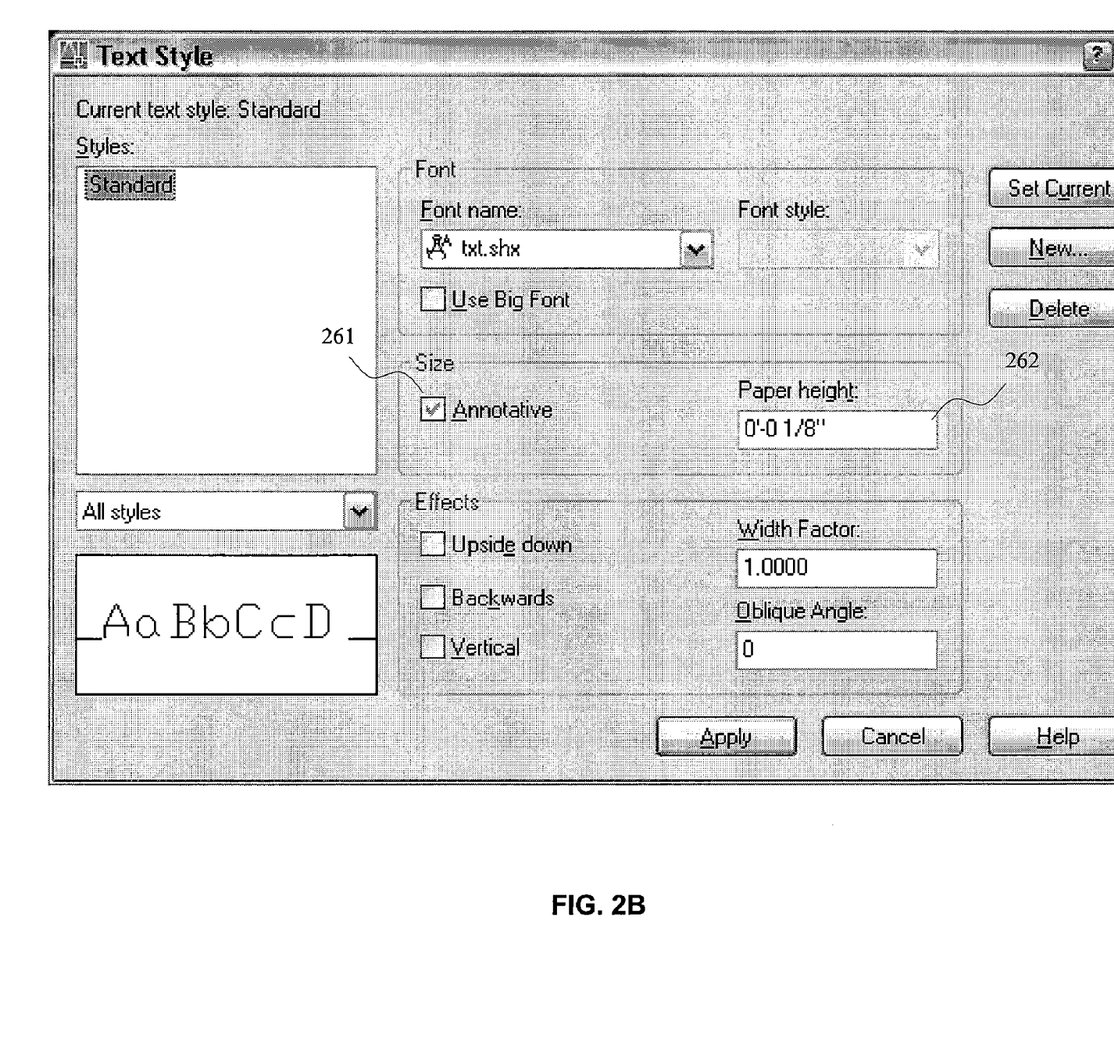

FIG. 2B represents an input dialog window for managing the style of an annotation. It controls the properties of the annotation object and is displayed to the user when the annotation object is created. With the input dialog window of FIG. 2B, the user can specify a custom fixed size for the annotation object by checking the box 261 (which sets its annotative property to be equal to 1) and inputting a paper height size (i.e., text height size in paper space) in input window 262. The input dialog window of FIG. 2B also allows the user to specify other properties of the annotation object including special display effects, such as "Upside down," "Backwards," and "Vertical." Using a similar dialog window, the user can specify the visibility of the annotation and the rotation of the annotation to any arbitrary angle. Further, the annotation object keeps track of the position of the annotation. When the user moves the annotation to a different position in CAD drawing 120, the position property of the annotation object is updated to reflect the new position.

Figure 2C:
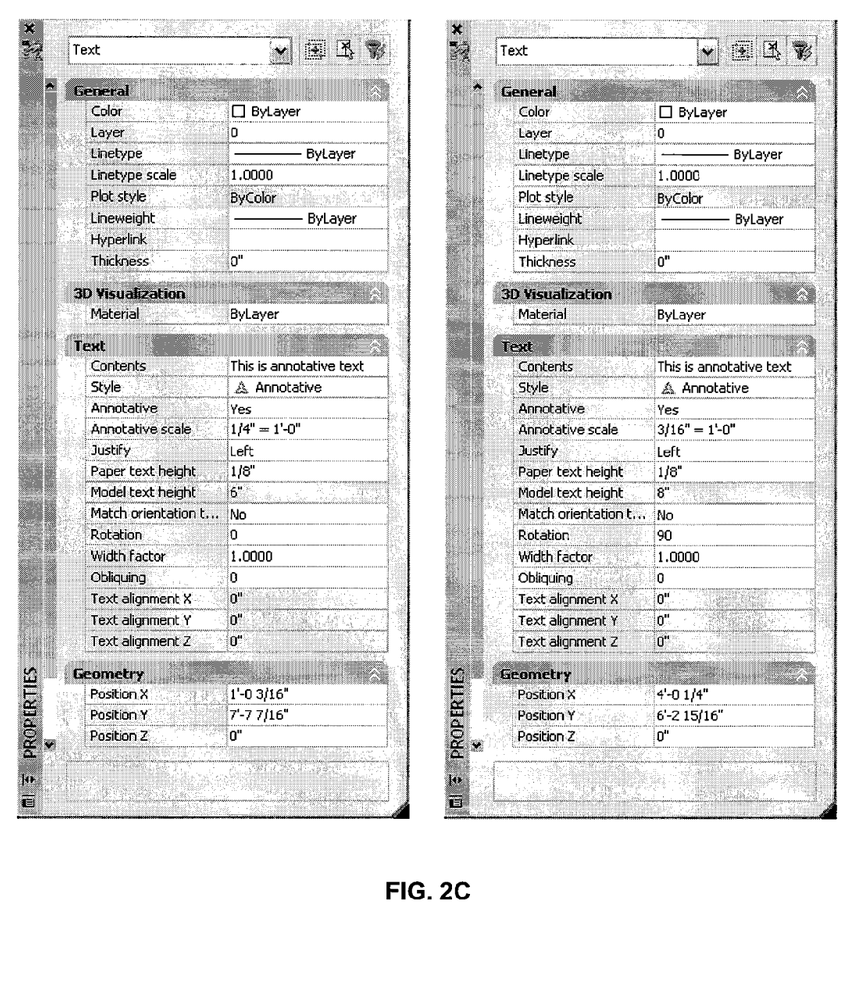

FIG. 2C shows a property control panel that is displayed to the user when an annotation object is selected after it has been created. It shows the paper text height of the object specified by the user and the model text height—the height of the text in model units. It also shows the properties of the same object for different annotation scales. When the annotation scale of the view changes, the scale of the object (and the model text height) changes, but the paper text height remains the same.

Figure 2D:
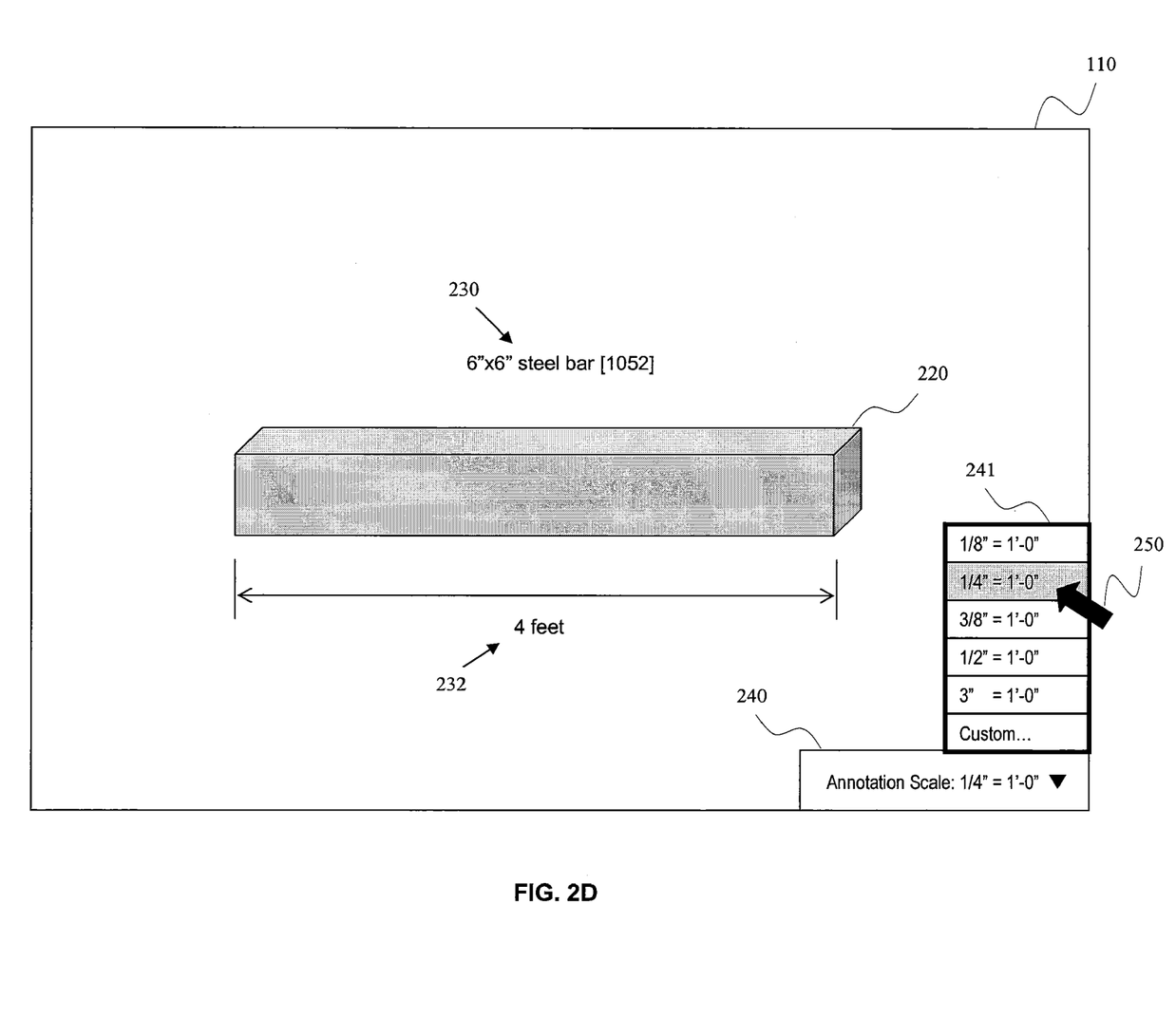

In the embodiments of the present invention illustrated herein, an annotation object is permitted to have different properties for different annotation scales. For example, for an annotation scale of ½"=1'-0", the user may specify the annotation object associated with annotation 230 to be "not visible" whereas for an annotation scale of ¼"=1'-0", the user may specify it to be "visible." To switch amongst different annotation scales, an annotation scale menu 241, which is shown in FIG. 2D, is provided. The annotation scale menu 241 is displayed when the user selects the menu arrow (▼) on the annotation scale 240 using an input device. FIG. 2D shows a selection of the ¼"=1'-0" annotation scale by the user. After this selection is made, all user inputs that affect the properties of annotation objects will be valid only for those annotations corresponding to an annotation scale of ¼"=1'-0".

Figure 3A:
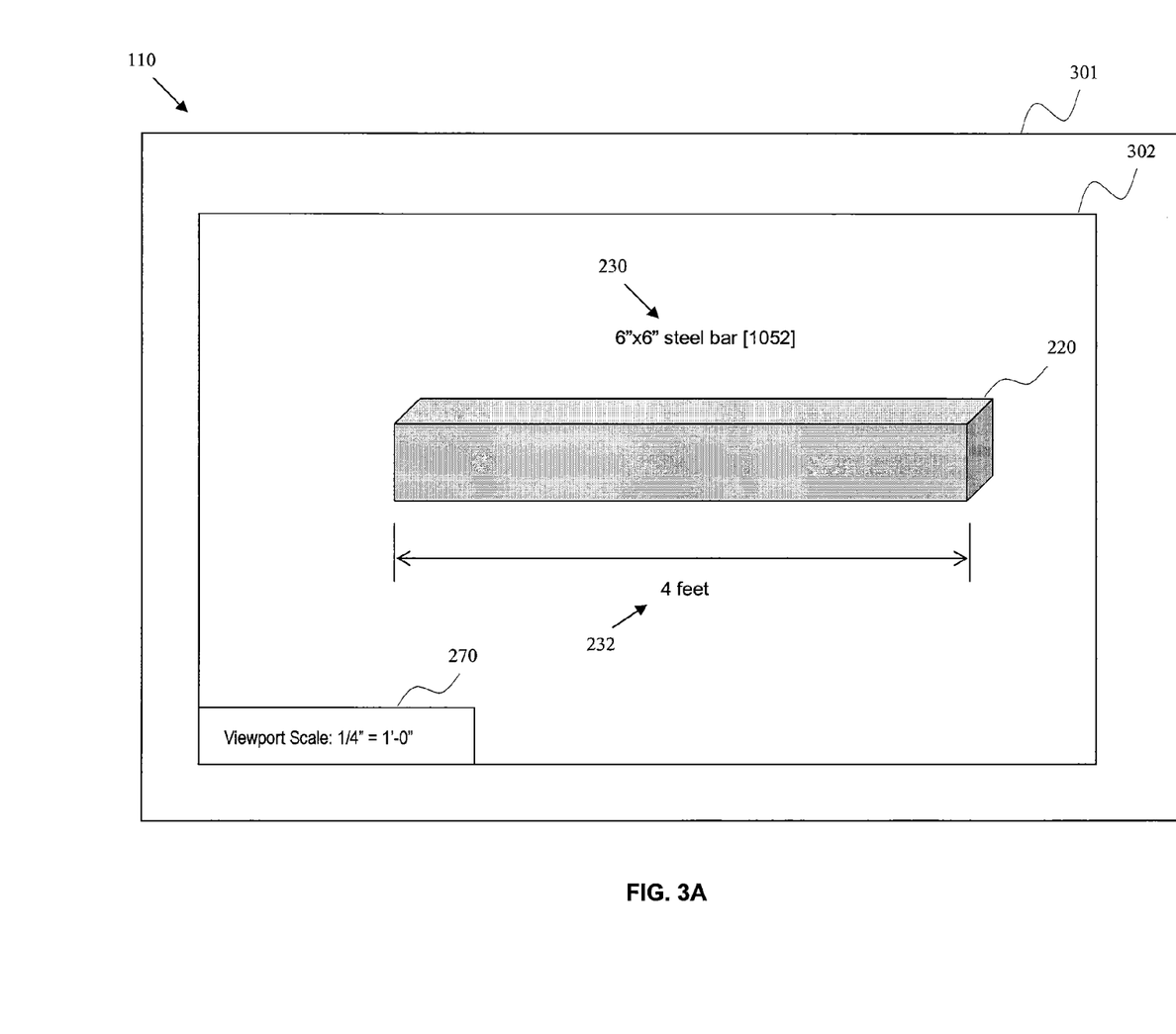
FIGS. 3A-3D are schematic representations of graphical user interfaces that illustrate the size, position and orientation of annotations in relation to the modeled object.

FIGS. 3A-3D are schematic representations of GUIs 110 that illustrate the size, position and orientation of annotations 230, 232 in relation to the modeled object 220. FIG. 3A illustrates a paper space viewport 302 (on a sheet 301 representing a sheet of paper) at a scale of ¼"=1'-0". The viewport scale is indicated by reference numeral 270. The sizes of the annotations 230, 232 are defined in model space as follows. First, the user selects the annotation scale (¼"=1'-0") from the annotation scale menu 241 like the one shown in FIG. 2D. Then, the user creates the annotation object using an annotative style (as shown in FIG. 2B). The user then checks the box 261 and inputs the desired text height size in input window 262. When the user creates the viewport in paper space shown in FIG. 3A at the scale of ¼"=1'-0", the annotations 230, 232 are displayed at their paper text size sizes as defined by the user.

Figure 3B:
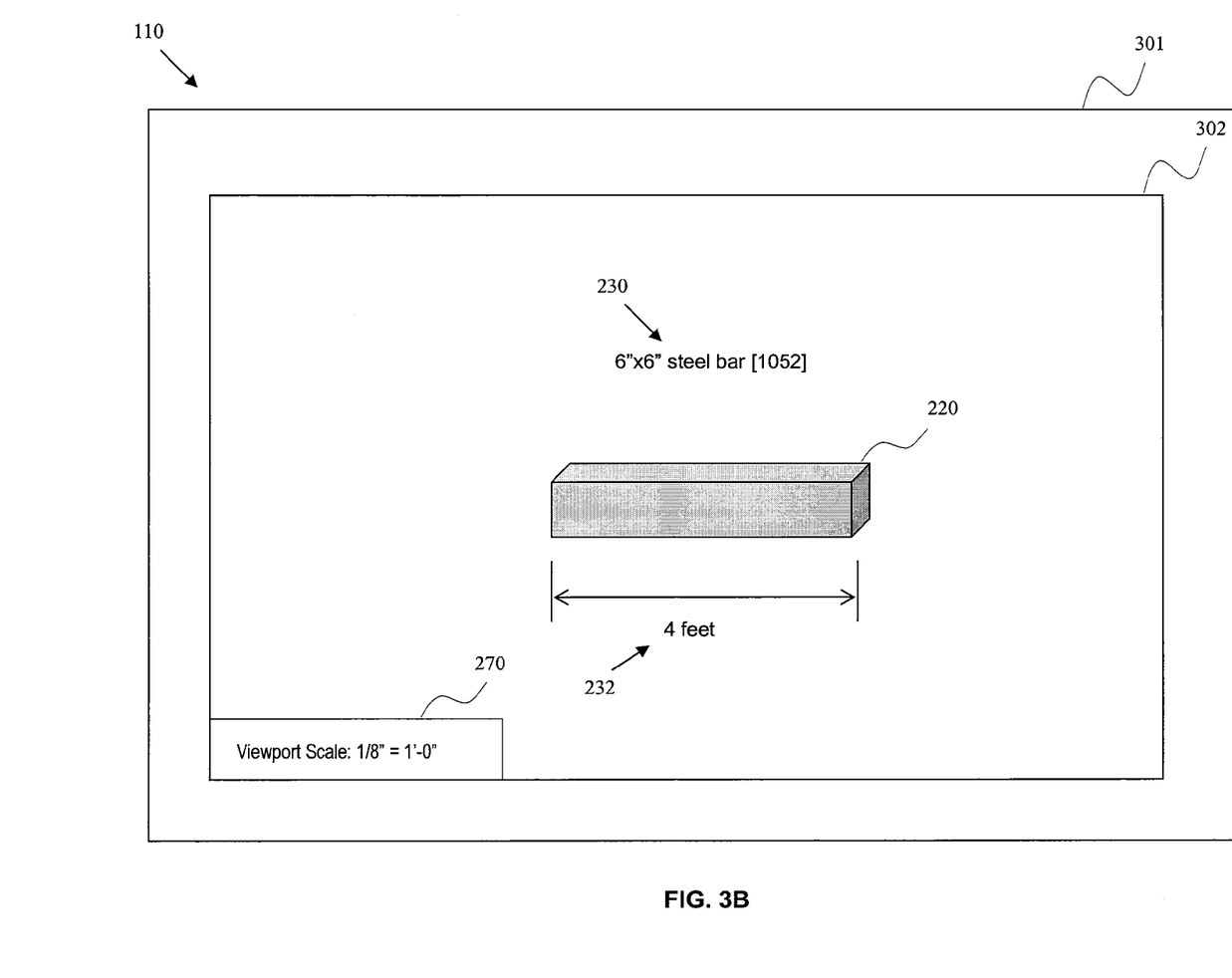

If the user wishes the annotations to be displayed in a viewport or plotted at a different scale, the user can select the annotations and specify the additional scales to support. When changing the annotation scale of the model, the text will update to the appropriate size and can be repositioned as needed. FIG. 3B represents the same model geometry and annotations displayed in a paper space viewport at a scale of ⅛"=1'-0". While the model geometry is scaled down based on the viewport scale, the annotations maintain a fixed size relative to the sheet.

FIG. 3B illustrates a paper space viewport 302 (on a sheet 301 representing a sheet of paper) at a scale of ⅛"=1'-0". The viewport scale is indicated by reference numeral 270. The sizes of the annotations 230, 232 are defined in model space as follows. First, the user selects the annotation scale (⅛"=1'-0") from the annotation scale menu 241 like the one shown in FIG. 2D. Then, the user selects an annotation (e.g., annotation 230 or annotation 232) and accesses a property control panel like the one shown in FIG. 2C to change the properties of the annotation object. When the user creates the paper space viewport shown in FIG. 3B at the scale of ⅛"=1'-0", the annotations 230, 232 are not scaled down to the viewport scale but maintain their fixed sizes as defined by the user.

Figure 3C:
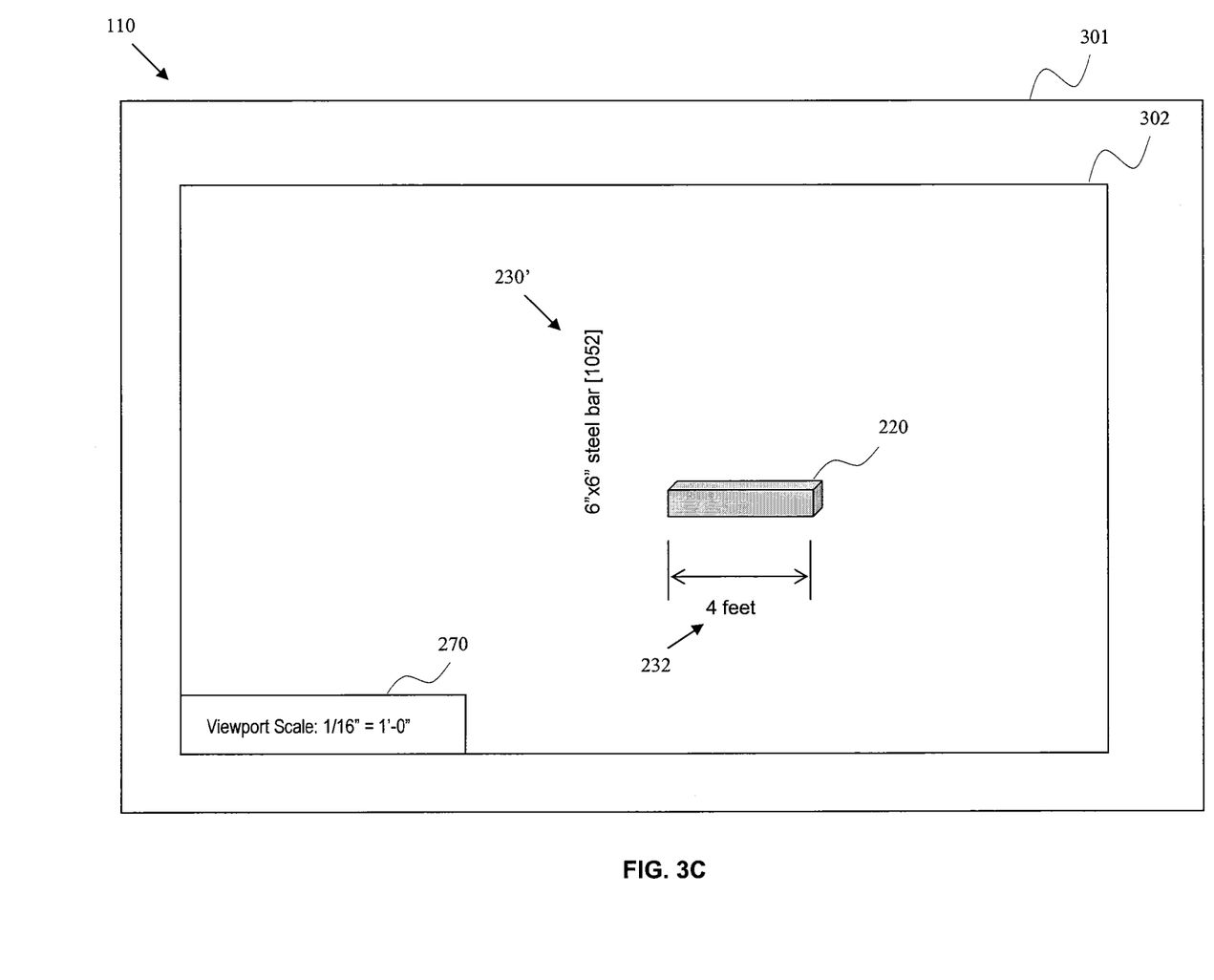

FIG. 3C shows the same model geometry and annotations displayed in a paper space viewport 302 (on a sheet 301 representing a sheet of paper) at a scale of 1/16"=1'-0", but the annotation is rotated and repositioned when displayed at this scale. The viewport scale is indicated by reference numeral 270. The sizes of the annotations 230', 234 are defined in model space as follows. First, the user selects the annotation scale (1/16"=1'-0") from the annotation scale menu 241 like the one shown in FIG. 2D. Then, the user selects an annotation (e.g., annotation 230 or annotation 232) and accesses a property control panel like the one shown in FIG. 2C to change the properties of the annotation object. When the user creates the paper space viewport shown in FIG. 3C at the scale of 1/16"=1'-0", the annotations 230', 232 are not scaled down to the viewport scale but maintain their fixed sizes as defined by the user. The paper space viewport of FIG. 3C also illustrates a different position and an orientation of the annotation 230'. The position of the annotation 230' has been moved from its original position that is above the modeled object to a new position that is to the left of the modeled object. Further, the orientation of the annotation 230' has been rotated by 270°. These two new properties of the annotation object 230' are stored as properties of the annotation object 230' associated with the viewport scale of 1/16"=1'-0".

Figure 3D:
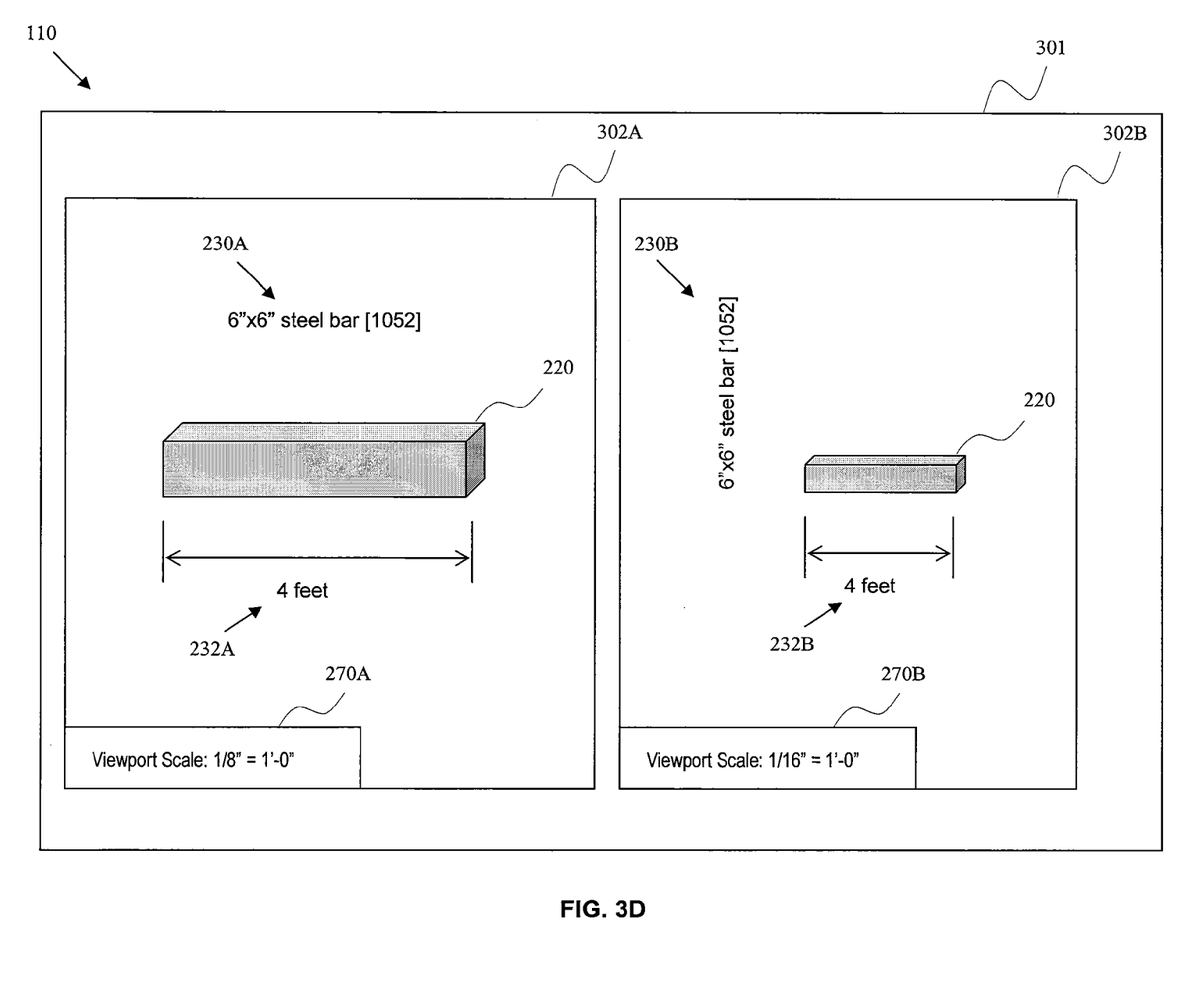

FIG. 3D illustrates two paper space viewports 302A, 302B (on a sheet 301 representing a sheet of paper). The paper space viewport 302A is at a scale of ⅛"=1'-0". The paper space viewport 302B is at a scale of 1/16"=1'-0". The scale for viewport 302A is indicated by reference numeral 270A. The scale for viewport 302B is indicated by reference numeral 270B. The side-by-side view of the two paper space viewports 302A, 302B shows that the size of annotation 232A is the same as the size of annotation 232B even though the modeled object 220 is scaled down. The side-by-side view of the two paper space viewports 302A, 302B also shows that an annotation can be displayed without rotation in one view (annotation 230A) and with rotation in another view (annotation 230B).

Figure 4A:
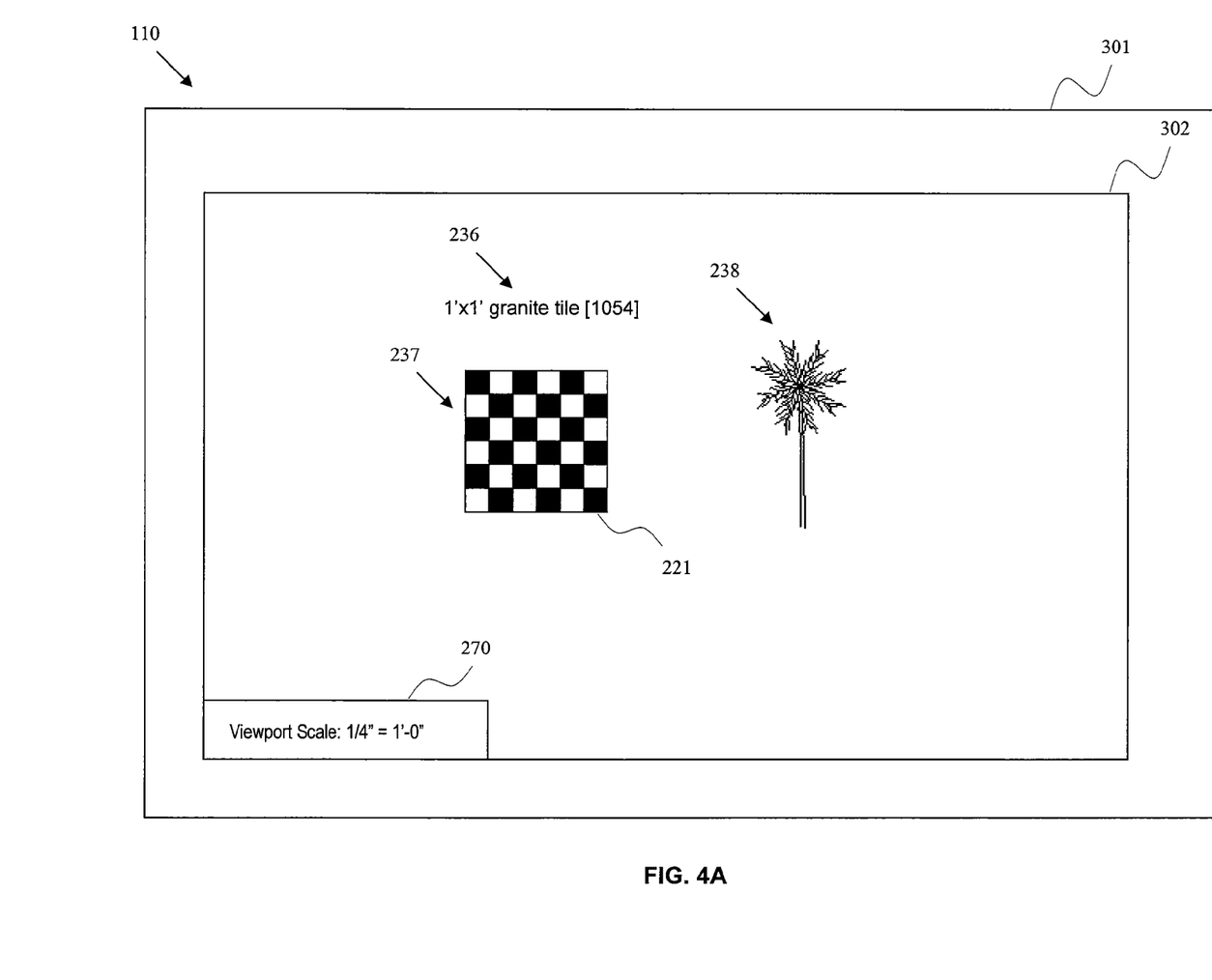
FIGS. 4A-4B are schematic representations of graphical user interfaces that illustrate the size of graphic annotations in relation to the modeled object.
Figure 4B:
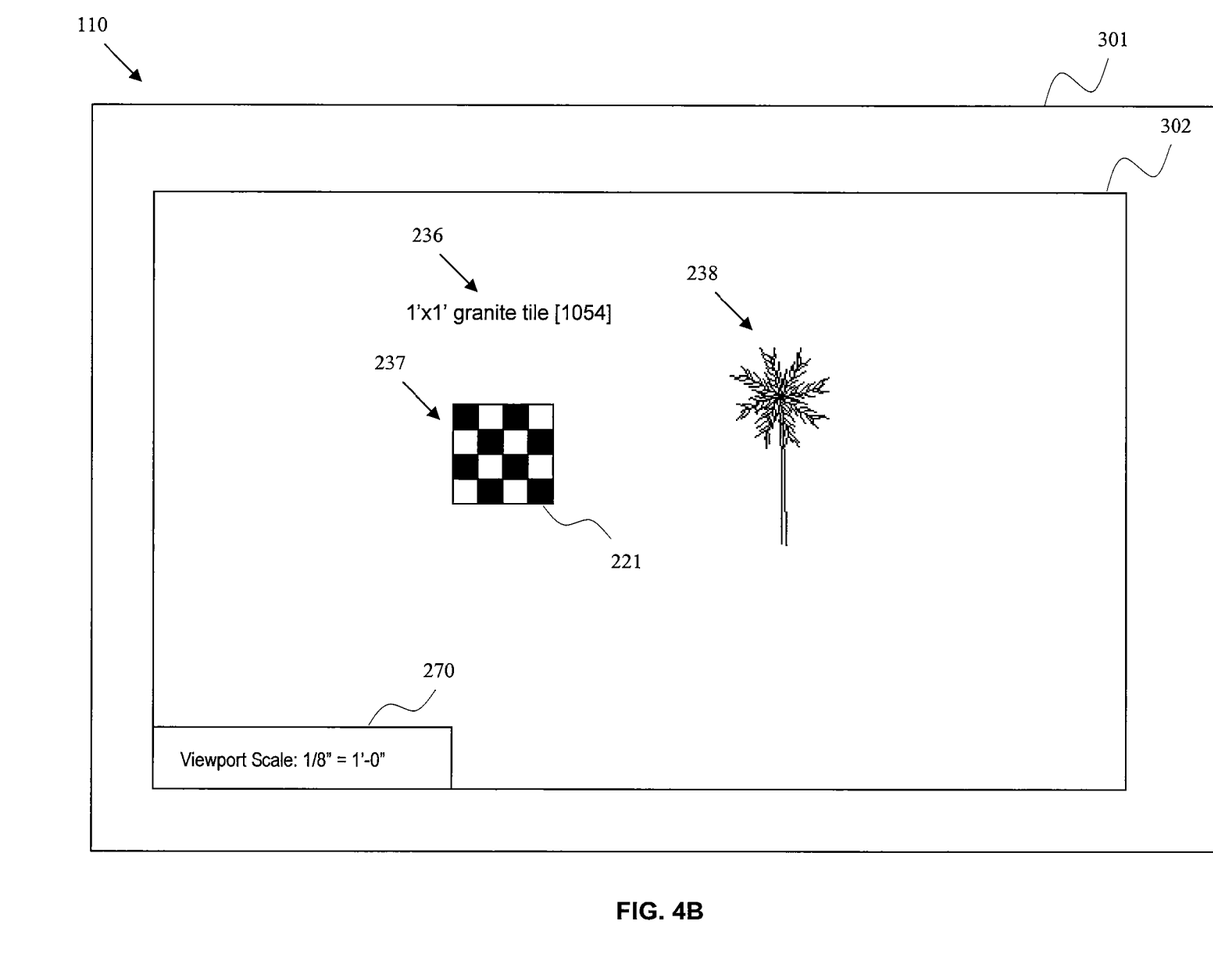

FIGS. 4A-4B are schematic representations of GUIs 110 that illustrate the size of graphic annotations such as hatch patterns and symbols in relation to the modeled object 221. FIG. 4A illustrates a paper space viewport 302 (on a sheet 301 representing a sheet of paper) at a scale of ¼"=1'-0". The size of the text annotation 236 is defined in model space as described above. The sizes of the graphic annotation 237 (the square with a hatch pattern) and the graphic annotation 238 (tree symbol) are defined in a similar manner. First, the user selects the annotation scale (¼"=1'-0") from the annotation scale menu 241 like the one shown in FIG. 2D. Then, the user selects an annotation (e.g., annotation 237 or annotation 238) and creates the annotation object using an annotative style (as shown in FIG. 2B). The user then checks the box 261 and inputs the desired graphic annotation height size (e.g., the height of the repeating pattern for the graphic annotation 237 or the height of the tree symbol for the graphic annotation 237) in input window 262. When the user creates the paper space viewport shown in FIG. 4A at the scale of ¼"=1'-0", the annotations 236, 237, 238 are not scaled down to the viewport scale but maintain their fixed sizes as defined by the user. FIG. 4B illustrates a paper space viewport 302 (on a sheet 301 representing a sheet of paper) at a scale of ⅛"=1'-0". After the user selects the annotation scale (⅛"=1'-0") from the annotation scale menu 241 like the one shown in FIG. 2D, the sizes of the text annotation 236 and graphic annotations 237, 238 are defined in model space as described above with reference to FIG. 4A.

Figure 5:
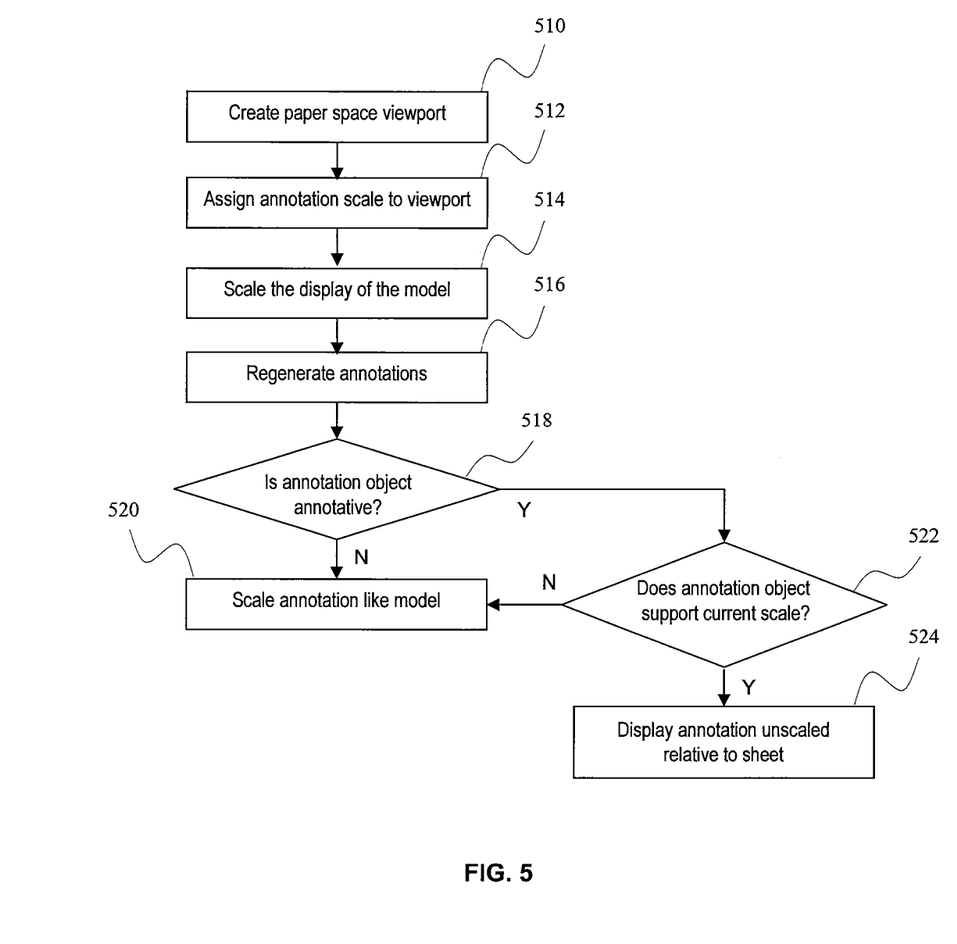
FIG. 5 is a flow diagram that illustrates the process for generating annotations according to an embodiment of the present invention.

FIG. 5 is a flow diagram that illustrates the process for generating annotations according to an embodiment of the present invention. The illustrated process is carried out by a computer in response to instructions from CAD application 105. In step 510, a paper space viewport is created. Then, an annotation scale is assigned to the paper space viewport (step 512). Within the paper space viewport, the modeled object is scaled (step 514) and the annotation objects are regenerated based on their properties (step 516). If an annotation object is not annotative (i.e., annotative property=0), the annotation is scaled just like the modeled object (steps 518 and 520). If the annotation object is annotative (i.e., annotative property=1) and supports the assigned scale, the annotation is displayed unscaled relative to the sheet (steps 518, 522 and 524). On the other hand, if the annotation object is annotative but does not support the assigned scale (steps 518 and 522), step 520 is carried out and the annotation object is scaled just like the modeled object; alternatively, instead of carrying out step 520, the annotation object can be hidden.

Figure 6:
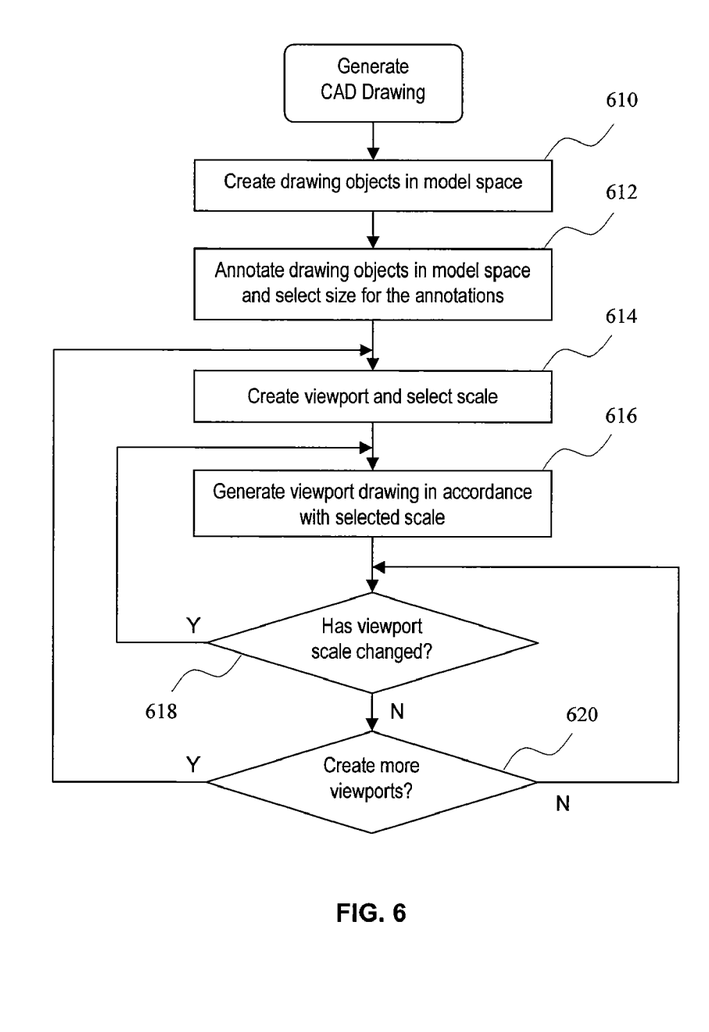
FIG. 6 is a flow diagram that illustrates the process for generating multiple viewports with different viewport scales.

FIG. 6 is a flow diagram that illustrates the process for generating multiple viewports with varying scales. The illustrated process is carried out by a computer in response to user inputs made through various GUIs. In step 610, drawing objects are created in model space. Then, in step 612, the drawing objects in model space are annotated and the sizes for the annotations are selected. For example, the size of a text annotation to be displayed at a viewport scale of ¼"=1'-0" may be set as ⅛", and the size of the same text annotation to be displayed at a viewport scale of ½"=1'-0" may be also set as ⅛".

In steps 614 through 620, one or more viewports are created from the drawing objects created in model space. The view and the scale associated with the viewport are selected in step 614. In step 616, the viewport drawing is generated in accordance with the selected scale. During this step, the drawing objects are scaled down, but the annotations may or may not be scaled down. If the annotative property associated with an annotation is zero, the annotation is scaled down. However, if the annotative property associated with an annotation is one, the annotation is not scaled down and is generated in accordance with the fixed size input by the user. Then, in step 618, the computer monitors for changes in any of the viewport scales. If it is determined that any of the viewport scales has changed, the process flow returns to step 616 and the viewport drawing associated with the changed viewport scale is regenerated in accordance with the changed viewport scale. The process flow also returns to step 616 if new viewports are created by the user (step 620).

While the foregoing is directed to embodiments of the present invention, other and further embodiments of the invention may be devised without departing from the basic scope thereof, and the scope thereof is determined by the claims that follow.

What is claimed is:

1. A computer-implemented method for generating a CAD drawing in a workspace representing a sheet of paper on which the CAD drawing is to be outputted, wherein the CAD drawing includes modeled objects and annotations, said method comprising the steps of:
   receiving a user input that specifies a first scale for a viewport;
   generating a drawing in model space of a modeled object having a first size in the viewport in accordance with the first scale;
   receiving a user input that specifies a fixed size in paper space for annotations to be included in the drawing;
   generating a first annotation in model space having a size in paper space equal to the fixed size relative to a sheet of paper on which the first annotation is to be output;
   receiving a user input that specifies a second scale for the viewport; and
   in response to receiving the user input that specifies the second scale, generating a scaled drawing in model space of the modeled object having a second size, wherein the first annotation in the scaled drawing maintains a size equal to the fixed size in paper space.

2. The method according to claim 1, wherein the annotations comprise one or more of text, dimensions, hatch patterns, and symbols.

3. The method according to claim 1, further comprising the step of receiving a user input that specifies a rotation of the first annotation.

4. The method according to claim 1, wherein the viewport is divided into first and second viewports, and the first scale is selected for the first viewport and the second scale is selected for the second viewport, and wherein the fixed size in paper space of annotations generated in the first viewport is equal to the fixed size in paper space of annotations generated in the second viewport.

5. The method according to claim 4, wherein the annotations are generated using a first set of annotation objects, wherein the first set of annotation objects is used to generate the annotations in the first viewport and the second viewport.

6. The method according to claim 1, further comprising the steps of:
   determining that an annotative property associated with the first annotation has a value equal to a first value;
   in response to receiving the user input that specifies the second scale, not scaling the first annotation in accordance with the second scale so that the first annotation has a size that remains equal to the specified fixed size in paper space;
   determining that an annotative property associated with a second annotation has a value equal to a second value; and
   in response to receiving the user input that specifies the second scale, scaling the second annotation in accordance with the second scale so that the second annotation has a size that is not equal to the specified fixed size in paper space.

7. A computer readable storage medium storing instructions that, when executed by a processor, cause a computer system to carry out the steps of:
   receiving a user input that specifies a first scale for a viewport;
   generating a drawing in model space of a modeled object having a first size in the viewport in accordance with the first scale;
   receiving a user input that specifies a fixed size in paper space for annotations to be included in the drawing;
   generating a first annotation in model space having a size equal in paper space to the fixed size relative to a sheet of paper on which the first annotation is to be output;
   receiving a user input that specifies a second scale for the viewport; and
   in response to receiving the user input that specifies the second scale, generating a scaled drawing in model space of the modeled object having a second size, wherein the first annotation in the scaled drawing maintains a size equal to the fixed size in paper space.

8. The computer readable storage medium according to claim 7, wherein the instructions further cause the computer system to carry out the steps of prompting a user to specify the fixed size for the first annotation and storing the user specified fixed size.

9. The computer readable storage medium according to claim 8, wherein the instructions further cause the computer system to carry out the steps of prompting a user to specify a rotation angle for the first annotation and storing the user specified rotation angle, wherein the first annotation is generated in the viewport in accordance with the user specified rotation angle.

10. The computer readable storage medium according to claim 7, wherein the viewport is divided into first and second viewports, and the first scale is selected for the first viewport and the second scale is selected for the second viewport, and wherein the fixed size of annotations generated in the first viewport is equal to the fixed size of annotations generated in the second viewport.

11. The computer readable storage medium according to claim 10, wherein the annotations are generated using a first set of annotation objects, wherein the first set of annotation objects is used to generate the annotations in the first viewport and the second viewport.

12. The computer readable storage medium according to claim 7, further comprising the steps of:
   determining that an annotative property associated with the first annotation has a value equal to a first value;
   in response to receiving the user input that specifies the second scale, not scaling the first annotation in accordance with the second scale so that the first annotation has a size that remains equal to the specified fixed size in paper space;
   determining that an annotative property associated with a second annotation has a value equal to a second value; and
   in response to receiving the user input that specifies the second scale, scaling the second annotation in accordance with the second scale so that the second annotation has a size that is not equal to the specified fixed size in paper space.

13. A method for creating a CAD drawing in a number of viewports, each viewport having a scale and representing a sheet of paper on which the CAD drawing is to be printed, said method comprising the steps of:
   receiving a user input that specifies a fixed size in paper space for annotations to be included in each viewport;
   annotating the CAD drawing in model space with text having the fixed size;
   preparing a first viewport in which the CAD drawing is generated in model space in accordance with a first scale and the text is generated to maintain a size relative to the sheet of paper on which the annotations are to be printed that is equal to the specified fixed size in paper space; and
   preparing a second viewport in which the CAD drawing is to be generated in model space in accordance with a second scale and the text is generated to maintain a size that is equal to the specified fixed size in paper space.

14. The method according to claim 13, wherein the text is represented as a software object having a fixed size and multiple properties.

15. The method according to claim 14, wherein the multiple properties include scale, visibility, text position and rotation.

16. The method according to claim 15, wherein the scale of the software object corresponds to the scale of the viewport in which the text is to be generated.

17. The method according to claim 16, wherein the visibility of the software object determines whether or not the text is to be visible in the viewport.

18. The method according to claim 16, wherein the text position of the software object determines the position of the text in the viewport.

19. The method according to claim 16, wherein the rotation of the software object determines the amount of rotation of the text in the viewport.

20. The method according to claim 13, further comprising the step of changing the scale of the first viewport to a third scale, wherein, in response thereto, the CAD drawing is generated in model space in accordance with the third scale and the text is generated to maintain a size that is equal to the specified fixed size in paper space.

* * * * *